No. 641,990. Patented Jan. 23, 1900.
P. NEYENS.
MACHINE FOR PRODUCING SMOKE AND HEAT IN ORCHARDS.
(Application filed Nov. 14, 1898.)
(No Model.) 2 Sheets—Sheet 1.
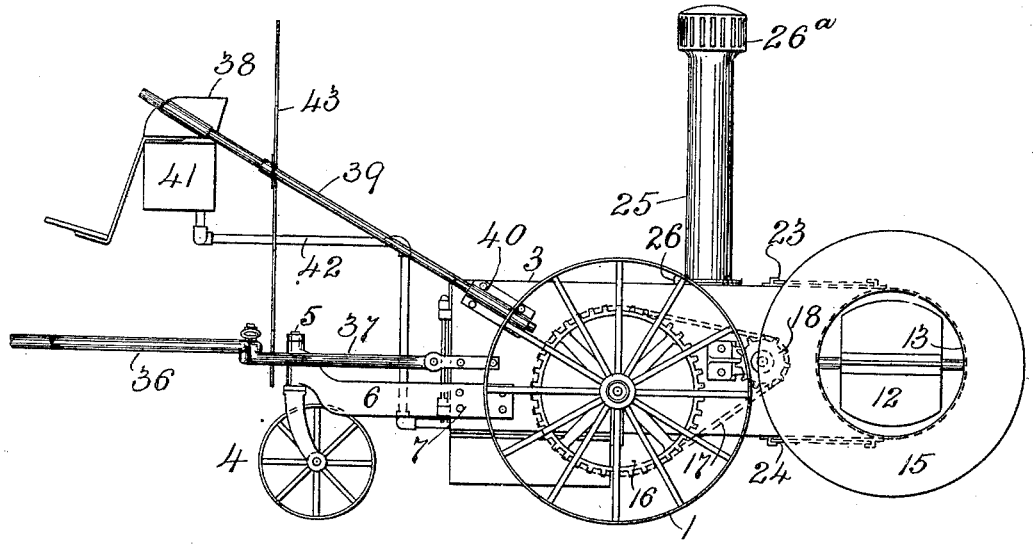
Fig. I.
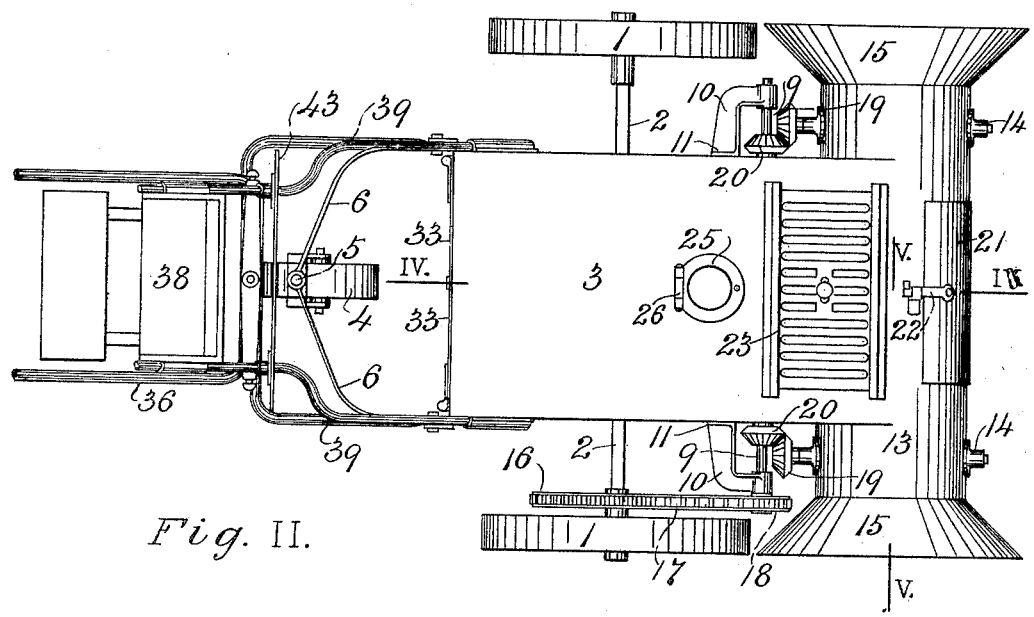
Fig. II.
Witnesses
Henry E. Brett
J. A. Roelofs
Inventor
Peter Neyens
BY Knight Bros.
ATTORNEYS No. 641,990. Patented Jan. 23, 1900.
P. NEYENS.
MACHINE FOR PRODUCING SMOKE AND HEAT IN ORCHARDS.
(Application filed Nov. 14, 1898.)
(No Model.)
2 Sheets—Sheet 2.
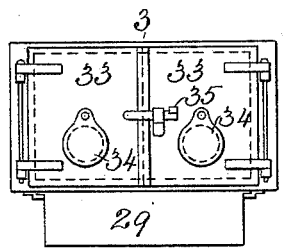
Fig. III
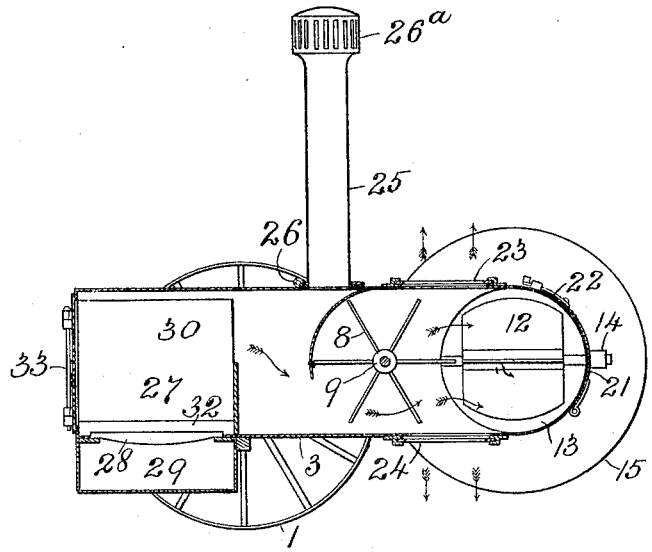
Fig. IV.
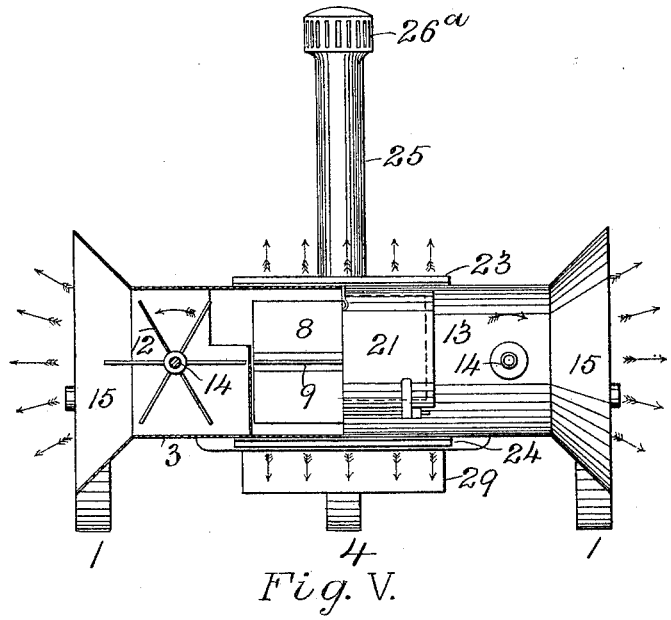
Fig. V.
Witnesses
Henry E. Brett
J. A. Roelofs
Inventor
Peter Neyens
BY Knight Bros.
ATTORNEYS

UNITED STATES PATENT OFFICE.

PETER NEYENS, OF DUNSMUIR, CALIFORNIA.

MACHINE FOR PRODUCING SMOKE AND HEAT IN ORCHARDS.

SPECIFICATION forming part of Letters Patent No. 641,990, dated January 23, 1900.

Application filed November 14, 1898. Serial No. 696,442. (No model.)

*To all whom it may concern:*

Be it known that I, PETER NEYENS, a subject of the Emperor of Germany, residing at Dunsmuir, in the county of Siskiyou and State of California, have invented certain new and useful Improvements in Machines for Producing Smoke and Heat in Orchards, of which the following is a full, clear, and exact description, reference being had to the accompanying drawings, which form a part of this specification.

My invention relates to an improved device for producing smoke and for raising the temperature in orchards or among growing vegetation or maintaining the temperature at such a point that the frosts will not do injury to the trees or other vegetation or the product growing thereon; and my invention consists in certain features of novelty hereinafter described and claimed.

Figure I is a side elevation of my improved device. Fig. II is a top view of the same. Fig. III represents a front elevation of the furnace. Fig. IV is a longitudinal section taken on line IV IV, Fig. II. Fig. V is in part a rear elevation and in part a transverse section taken on line V V, Fig. II.

Referring to the drawings, 1 represents the main drive-wheel, of which preferably there are but a single pair connected by a crank-axle 2.

3 represents the horizontal furnace-body, supported mainly by the axle 2, but having an additional support in a caster-wheel 4, journaled at 5 to a branching frame 6. The frame 6 extends out forwardly of the furnace-body 3 and has its respective arms secured at 7 to the sides of the furnace-body. In order to supply the draft to the furnace-body for carrying off the heat and smoke for distribution, I employ a central fan 8, mounted on a shaft 9. The shaft 9 extends transversely through the body of the furnace 3 and is journaled near its outer ends to right-angle brackets 10, the inner ends of said brackets 10 being secured at 11 to the sides of the furnace-body, said brackets serving as a journal-bearing for the shaft 9. I also employ in addition to the main fan 8 auxiliary fans 12. The auxiliary fans 12 are located within a horizontal cylinder 13 at the rear end of the furnace-body 3, said cylinder 13 extending transversely of the furnace-body and preferably being of greater length than the width of the furnace-body. The auxiliary fans 12 are mounted upon shafts 14, said shafts having their bearings in the cylinder 13 and are adapted to revolve therein. The cylinder 13 is provided at its respective ends with funnel-shaped extensions 15, which permit of the free egress and broad distribution of the heat and smoke passing from the furnace and forced out by the main and auxiliary fans.

16 represents a driving sprocket-wheel mounted upon the axle 2 and being connected by means of a sprocket-chain 17 with a small sprocket-wheel 18 on one end of the shaft 9, on which the main fan is mounted. The shafts 14 of the auxiliary fans are provided at their inner ends with beveled gears 19, which mesh with beveled gears 20 upon the shafts 9, a connection being thus formed between the shafts 9 and 14 in order that all of the fans should rotate simultaneously. The cylinder 13 is provided at its rear side with a trap-door 21, secured by a latch 22, thus affording access to the interior of the cylinder and the body of the furnace.

23 represents a sliding register on the top of the furnace-body, and 24 a similar register on the bottom of the furnace-body, by which air may be admitted or discharged according to circumstances.

25 represents a smoke-stack preferably hinged at 26 to the top of the furnace-body, the hinge admitting of the dropping of the smoke-stack in the case of interfering limbs of trees, &c. The top of the smoke-stack is preferably provided with a series of openings or slots 26$^a$, through which a portion of the heat and smoke is discharged.

27 represents the fire-box, which may be lined with any suitable material; 28, the grates, and 29 the ash-pan. Any form of fuel found most convenient may be burned; but I preferably use crude oil, a liquid form of fuel being easy to carry along with the machine. The area of the fire-box chamber may be increased or diminished in size by means of plates 30, placed therein, the top of said plates resting against the sides of the fire-box and their lower ends resting in contact with bottom plates 32.

33 represents the front doors of the furnace, having pivoted dampers 34.

35 represents a catch for holding the furnace-doors closed.

36 represents the shafts, to which an animal may be attached for pulling the device, said shafts being attached to bars 37, which are suitably connected with the body of the furnace.

38 represents the driver's seat, adjustably supported on rods 39, which have their inner ends secured to the furnace-body at 40.

41 represents the oil-supply tank, supported beneath the driver's seat, and 42 the stepped oil-supply pipe leading from the tank 41 to the fire-box.

43 represents a flat shield supported on the rods 39, the object of said shield being to prevent an undue amount of heat from reaching the driver and the animal pulling the device.

In operation my device is driven between the rows of trees or other vegetation needing protection from frost, the large amount of heat and smoke causing a smudge which is thrown off and distributes itself among the trees and vegetation, thus raising the temperature or preventing the fall of the same and preserving the growing trees and vegetation and the products thereof. A large amount of space is covered in a very short time, owing to the furnace being placed upon wheels and moved, as before described.

I claim as my invention—

1. A machine for producing smoke and heat in orchards, comprising a pair of drive-wheels, a horizontal furnace-body, a crank-axle whereby the furnace-body is mounted on the drive-wheels, brackets secured to the sides of the furnace-body, the shaft extending across and through the furnace-body and journaled in the brackets, gearing whereby the shaft is connected with a drive-wheel, a combined draft and blast fan mounted on the shaft within the furnace-body, and the register located in the top of the furnace-body and over the fan; substantially as described.

2. A machine for producing smoke and heat in orchards comprising a pair of drive-wheels, a horizontal furnace-body, a crank-axle whereby the furnace-body is mounted on the drive-wheels, brackets secured to the sides of the furnace-body, the shaft extending across and through the furnace-body and journaled in the brackets, gearing whereby the shaft is connected with a drive-wheel, a combined draft and blast fan mounted on the shaft within the furnace-body, and a register located in the bottom of the furnace-body and under the fan; substantially as described.

3. A machine for producing smoke and heat in orchards, comprising a pair of drive-wheels, a horizontal furnace-body, a crank-axle whereby the furnace-body is mounted on the drive-wheels, brackets secured to the sides of the furnace-body, the shaft extending across and through the furnace-body and journaled in the brackets, gearing whereby the shaft is connected with a drive-wheel, a combined draft and blast fan mounted on the shaft within the furnace-body, a register located in the top of the furnace-body and over the fan, and a register located in the bottom of the furnace-body, and under the fan; substantially as described.

4. A machine for producing smoke and heat in orchards, comprising a pair of drive-wheels, a horizontal furnace-body, a crank-axle whereby the furnace-body is mounted on the drive-wheels, brackets secured to the sides of the furnace-body, the shaft extending across and through the furnace-body and journaled in the brackets, gearing whereby the shaft is connected with a drive-wheel, a combined draft and blast fan mounted on the shaft within the furnace-body, and the horizontal distributing-cylinder extending across the end of the furnace-body and into which the fan discharges the products of combustion from the furnace-body; substantially as described.

5. A machine for producing smoke and heat in orchards, comprising a pair of drive-wheels, a horizontal furnace-body, a crank-axle whereby the furnace-body is mounted on the drive-wheels, brackets secured to the sides of the furnace-body, the shaft extending across and through the furnace-body, and journaled in the brackets, gearing whereby the shaft is connected with a drive-wheel, a combined draft and blast fan mounted on the shaft within the furnace-body, and the horizontal distributing-cylinder having funnel-shaped extensions and extending across the end of the furnace-body; substantially as described.

6. A machine for producing smoke and heat in orchards, comprising a pair of drive-wheels, a horizontal furnace-body, a crank-axle whereby the furnace-body is mounted on the drive-wheels, brackets secured to the sides of the furnace-body, the shaft extending across and through the furnace-body and journaled in the brackets, gearing whereby the shaft is connected with a drive-wheel, a combined draft and blast fan mounted on the shaft within the furnace-body, and the horizontal distributing-cylinder extending across the end of the furnace-body, and provided with a door in the side thereof whereby access may be gained to the furnace-body, and to the fan; substantially as described.

7. A machine for producing smoke and heat in orchards, comprising a pair of drive-wheels, a horizontal furnace-body, a crank-axle whereby the furnace-body is mounted on the drive-wheels, brackets secured to the sides of the furnace-body, the main shaft extending across and through the furnace-body and journaled in the brackets, gearing whereby the main shaft is connected with a drive-wheel, a combined draft and blast fan mounted on the main shaft within the furnace-body, the horizontal distributing-cylinder extending across the end of the furnace-body, and into which the fan discharges, the auxiliary shafts, extending across and through the distributing-cylinder, gearing whereby the auxiliary shafts are connected with the main shaft and the combined draft and blast fans, mounted on the auxiliary shafts within the distributing cylinder; substantially as described.

8. A machine for producing smoke and heat in orchards, comprising a pair of drive-wheels, a horizontal furnace-body, a crank-axle whereby the furnace-body is mounted on the drive-wheels, brackets secured to the sides of the furnace-body, the shaft extending across and through the furnace-body and journaled in the brackets, gearing whereby the shaft is connected with a drive-wheel, a combined draft and blast fan mounted on the shaft within the furnace-body, the horizontal distributing-cylinder extending across the end of the furnace-body, and the smoke-stack provided with a series of vertical openings through which part of the smoke and heat are distributed; substantially as described.

9. A machine for producing smoke and heat in orchards, comprising a pair of drive-wheels, a horizontal furnace-body, a crank-axle whereby the furnace-body is mounted on the drive-wheels, brackets secured to the sides of the furnace-body, the shaft extending across and through the furnace-body and journaled in the brackets, gearing whereby the shaft is connected with a drive-wheel, a combined draft and blast fan mounted on the shaft within the furnace-body, the horizontal distributing-cylinder extending across the end of the furnace-body, a fire-box, the stepped oil-supply pipe connected with the fire-box, the driver's seat supported from the furnace-body, and the tank supported on the stepped oil-supply pipe beneath the driver's seat; substantially as described.

10. A machine for producing smoke and heat in orchards, comprising a pair of drive-wheels, a horizontal furnace-body, a crank-axle whereby the furnace-body is mounted on the drive-wheels, brackets secured to the sides of the furnace-body, the shaft extending across and through the furnace-body and journaled in the brackets, gearing whereby the shaft is connected with a drive-wheel, a combined blast and draft fan mounted on the shaft within the furnace-body, the horizontal distributing-cylinder extending across the end of the furnace-body, the rods secured to the furnace-body, the driver's seat supported on the rods, and the shield suspended on the rods between the furnace-body and the driver's seat; substantially as described.

PETER NEYENS.

Witnesses:
R. A. CAMPBELL,
H. C. DALLASHIDE.